United States Patent Office 2,851,421
Patented Sept. 9, 1958

2,851,421

POWER TRANSMISSION FLUIDS

Allan Manteuffel, Union, and William D. Gilson, Crystal Lake, Ill., assignors to The Pure Oil Company, Chicago, Ill., a corporation of Ohio No Drawing. Application August 7, 1951
Serial No. 243,584

8 Claims. (Cl. 252—75)

The present invention relates to power transmission fluids and compositions therefor, more particularly it relates to a new composition of power transmission fluid for hydrokinetic drive mechanisms meeting the requirements of the General Motors passenger car automatic transmission fluid tests as described in the publication by the General Motors Corporation bearing this title, dated May 18, 1949, and as modified on July 14, 1950.

Various automatic transmissions using the hydrokinetic principle such as torque converters and hydramatic drives have been developed, teamed with high output engines which are designed to give high speed performance, maximum acceleration and deceleration, and new driving ease. These automatic transmissions and fluid couplings cannot operate using ordinary mineral oil without addends or lubricating oil compositions designed for use in the crankcase of an internal combustion engine because of the necessity that they withstand high shear stresses, excessive load conditions, high temperatures and must exhibit certain rigorous specifications as to miscibility, pour point, effect on rubber seals and gaskets, toxicity, odor, viscosity, stability, corrosiveness, anti-squawk or anti-chatter, and rusting and the like. The present invention is directed to the discovery of certain combinations of addends which, when incorporated in a mineral lubricating oil in specified amounts, yields an automatic transmission fluid that passes the rigorous requirements of the passenger car automatic transmission fluid acceptance tests; and which passes the oven rubber seal test, found to be one of the most difficult specific tests of the numerous passenger car automatic transmission fluid acceptance tests.

This invention is directed to the discovery that the composition comprising metal salts of alkylated phenol sulfides and alkaline earth metal sulfonates as described and set forth in United States Patent 2,379,241, dated June 26, 1945, by J. C. McNab and W. T. Watkins, Jr., have the property of protecting the component rubber parts of an automatic transmission from cracking, hardening and deterioration, as required by the oven rubber seal test when incorporated in a mineral lubricating oil. It has also been discovered that the composition comprising metal salts of alkylated phenol sulfides and alkaline earth metal sulfonates have the property of overcoming the deleterious effect of other known antioxidant, oiliness and detergent addends which latter are found to be necessary in these ATF compositions so that they will meet the requirements of the passenger car automatic transmission fluid acceptance tests. It has further been found that a certain relationship exists between the amount of pour depressant and anti-squawk additives within a given formulation to obtain the proper pour characteristics in the finished blend. This pour property is, in turn, related to the oxidation stability, i. e., the amounts of detergent-inhibitor which may be tolerated in the blend. Lastly, it has been found that the viscosity of the anti-squawk or anti-chatter additive influences the pour point of the finished blend.

It is therefore the primary object of this invention to formulate an automatic transmission fluid which displays the diverse properties of a coolant, lubricant, and power transfer medium while exhibiting the proper anti-oxidation, detergent, viscosity stability, viscosity index, pour point, anti-rust, anti-squawk, anti-chatter properties, and antifoam properties.

An object of this invention is to provide an automatic transmission fluid which passes the oven rubber seal test.

A further object of this invention is to develop a power transmission fluid which meets the specifications required of a General Motors passenger car automatic transmission fluid.

Another object of this invention is to provide an automatic transmission fluid which contains an anti-squawk additive having a certain viscosity to yield particular pour characteristics in the fluid.

Another object of this invention is to provide the proper ratio of pour depressant and anti-squawk additive in a blended automatic transmission fluid which yields acceptable pour characteristics in the finished blend.

Still another object is to balance the detergent-inhibitor additive against the content of anti-squawk additive to give the proper oxidation stability without affecting the pour point of the blend.

Further objects of the invention will become apparent as the description thereof proceeds.

Some of the details of the General Motors requirements hereinafter referred to as passenger car automatic transmission fluid acceptance test are set forth in the following table:

The selection of base oils is influenced by the viscosity, viscosity index, flash, fire, and pour characteristics shown

TABLE I

*Passenger car automatic transmission fluids*

| Test | Designation | Requirements |
|---|---|---|
| Miscibility | Ordinance Department 2-105B | Pass—complete miscibility and homogeneity with 8 reference oils. |
| Viscosity | A. S. T. M. D445-46T<br>A. S. T. M. D446-39 | SUS/210° F., 54-56*. |
| Viscosity index | A. S. T. M. D567-41 | 135*—(150) minimum. |
| Flash point, °F | A. S. T. M. D92-33 | 365 minimum. |
| Fire point, °F | A. S. T. M. D92-33 | 395 minimum. |
| Pour point, °F | A. S. T. M. D97-39 | −35 maximum. |
| Copper strip | A. S. T. M. D130-49T | Pass—3 hours at 300° F. |
| Anti-foaming properties | Detroit Transmission Division foam test. | Pass. |
| Heating test | | Pass—125 hours at 250° F. |
| Non-corrosion and non-rusting properties. | A. S. T. M. D665-47T | Pass. |
| Effect on seals | | Pass—heat seal in fluid for 150 hours at 300° F. Heat tensile strength test specimen of approved composition in fluid for 75 hours at 300° F. |
| Odor | Qualitative | Pass—no odor under operating conditions. |
| Non-toxic properties | | Pass—determine chlorine and/or any other toxic components. |
| Oxidation | CRC-L-4 | Pass—standard test except the fluid is diluted, prior to test, with equal volume of reference oil LL-137 and crankcase temperature maintained at 265° F. |
| Non-chatter and non-squawking properties. | | Pass—evaluated by cycling test and OM2 Bearing Test. |
| Durability | (Cycling test) | Pass—Dynamometer 1-2-3-4 cycling test on an engine driven hydramatic unit. |
| Viscosity stability | | Pass—determine increase in viscosity at conclusion of durability test. |
| Frictional properties | | Pass—OM2 bearing test. |
| Performance tests | | Pass—proving ground tests. |

*By revision of July 14, 1950, the maximum Saybolt viscosity at 0° F. is set at 7,00 seconds maximum, and the minimum at 210° F. is 49 seconds, which means the V. I. is approximately 135.

The formulation of an automatic transmission fluid, whether for use as a general purpose power transmission medium or meeting the requirements set forth in Table I, involves the careful selection and blending of the right amounts of a number of ingredients and the careful evaluation of the blends. The mineral lubricating oil base or blend of lubricating oils must be compatible with and capable of retaining in solution a large percentage of various additives and must in general have a viscosity between about 90–120 SUS at 100° F. To meet the more stringent requirements set forth in Table I, the viscosity characteristics are more limited and must be approximately 110 SUS at 100° F. Since the viscosity index requirement of 135 to 150 for the finished blend is high, only high viscosity index mineral lubricating oils are preferred. In the complex formulations of this invention, the high viscosities of some of the additives influence the viscosities of the blends and, accordingly, further limit and influence the maximum viscosity of mineral lubricating oil that can be used as the base oil. Preferably, high viscosity index Mid-Continent solvent refined base oils are used to meet the requirements of Table I.

It has been found that blends of neutral and bright stocks of lubricating oil, as for example blends of 100 vis or 70 vis Mid-Continent solvent refined neutral and 150 vis Mid-Continent solvent refined bright stock, will meet the viscosity requirements. The physical characteristics of typical lubricating oil stocks useful in preparing power transmission fluids in accordance with this invention are shown in the following table:

in Table II. The combination of 70 vis and 150 vis bright stock blended to 100 SUS at 100° F. is much more satisfactory than a straight 100 vis neutral base alone as far as the relative amounts of V. I. improvers and pour depressants necessary to be blended therewith to meet both the General Motors requirements and those of an all-purpose transmission fluid. Experiments have indicated that 80 to 85 vis neutral stocks could be used alone as the base oil provided they have the same V. I. and additive susceptibility as the 70 vis neutral stock. In blending certain neutral and bright stocks, it was noted that an appreciation in the viscosity index occurred, that is, the viscosity index of the blend was higher than that of either component of the blend. Advantage can be taken of this in meeting the viscosity index requirements for the lubricating oil bases. The reference oil (LL-137) is the oil referred to in Table I under CRC-L-4 oxidation test. It is used to determine the safety factors present in the finished blends as will be described.

No difficulty is experienced in formulating blends of lubricating oil fractions and the various available additives designed to increase the viscosity index or lower the pour point in order that the blends will meet the tests for viscosity, viscosity index, and pour point. Judicious selection of the mineral lubricating oil base with the proper amount of a viscosity index improver and pour point depressant allows the blend to not only meet the viscosity and pour point requirements, but also pass the miscibility, odor, toxicity, flash, and fire point specifications.

For this purpose, commercially available viscosity index

TABLE II

*Base oils*

| Mineral oil | API gravity | COC flash, °F. | COC fire, °F. | SUS at 100° F. | SUS at 210° F. | Vis. index | NPA color | Percent carbon residue | Percent sulfur | Stable pour, °F. |
|---|---|---|---|---|---|---|---|---|---|---|
| 100 vis. neutral | 33.6 | 405 | 450 | 103.2 | 39.7 | 101 | +2 | 0.00 | 0.12 | +5 |
| 70 vis. neutral | 36.6 | 370 | 405 | 71.3 | 36.9 | 111 | +1 | 0.00 | 0.18 | 0 |
| 150 bright stock | 26.8 | 570 | 630 | 2,511 | 156.0 | 99 | 6+ | 0.73 | 0.53 | −5 |
| Reference oil (LL-137) | 31.1 | 405 | 440 | 167 | 44.2 | 96 | 3 | 0.03 | 0.27 | B−20 | improvers which have the property of increasing the viscosity index of mineral oils, such as high molecular weight polymers of organic acids or polymers of organic acid esters, may be used. Additives marketed under the trade names of Santodex and Paratone may be used. One product under the trade name of Acryloid 150, a methacrylate polymer, is suitable and acts as both a pour depressant and viscosity index improver. Acryloid 710, a trade name for an acrylic acid polymer, may also be used for this purpose. In general, polymeric materials having viscosities of about 3000 to 3400 SUS at 210° F. and specific gravities less than that of water are useful in accordance with this invention in meeting the viscosity index requirements of 135 to 150 for an automatic transmission fluid.

The pour point requirement of below minus 35° F. may be met by incorporating a known pour point depressant, such as the proprietary product Santopour B, a low molecular weight condensation product of a chlorinated paraffin wax and a phenol which has been cut back or diluted with mineral oil to reduce its viscosity. Santopour B concentrate, the undiluted condensation product may also be used in the present formulations. Any pour depressant which will produce a finished blend of automatic transmission fluid meeting the minus 35° F. pour point requirement may be used.

The necessary detergent and anti-corrosion properties of the finished automatic transmission fluid are obtainable through the use of detergent-inhibitor type additives as used in engine lubricating oils. Such additives are designed to promote engine cleanliness and/or act as bearing corrosion inhibitors. Numerous additives including heavy metal salts or alkaline earth and alkali metal salts and soaps containing sulfur, nitrogen, and phosphorus are available for this purpose. One commercially available detergent is Stan-Add 42, a trade name for a potassium detergent comprising the potassium salt of a phosphorus pentasulfide-olefin reaction product. This particular detergent is considered as having little or no corrosion inhibiting properties. A typical corrosion inhibitor type of additive is Lubrizol 328, the trade name for a product comprising the zinc salt of methyl cyclohexanol phosphorus pentasulfide reaction product. As before stated one product under the trade name of Enjay CPS-61, an anti-oxidant-detergent, a composition comprising an oil soluble polyvalent metal salt of an alkylated hydroxy aryl sulfide mixed with selected alkaline earth metal sulfonates, and described in United States Patent 2,379,241, J. G. McNab, et al., not only serves its known function of anti-oxidant and detergent but in addition has the property of carrying the other addends, particularly the sulfur-containing anti-squawk agents (to be described), through the oven rubber seal test. The aryl group is preferably the phenyl group. A typical example of a product under the trade name of Enjay CPS-61 is the barium salt of hydroxy diisobutyl phenyl sulfide with calcium sulfonate.

Several additives are available which act both as inhibitors and anti-squawk compounds. The presence of squawk or chatter in an automatic transmission is undesirable and those ATF compositions meeting the passenger car ATF acceptance tests must show freedom from squawk or chatter under actual test conditions (to be described). Squawking has been described as a "stick-slip" action occurring generally as the transmission is shifting from second to third gear. The phenomenon is closely associated with the frictional or oiliness characteristics of the fluid. It occurs in the multi-disc drive clutches and speed range bands and may be overcome only with additives which are designed to cause the clutch and band parts to engage and disengage smoothly without "stick-slip." A typical test to determine whether or not a fluid is suitable relative to its anti-squawk and anti-chatter properties has been developed by the General Motors Corporation. The details of this test will be described. Additives which tend to overcome squawk or chatter and/or act as inhibitors include sulfurized sperm oil. A second trade-named additive, Nimco 1029, comprising a sulfurized wool grease containing about 4 percent by weight of sulfur, is useful both as an anti-squawk agent and inhibitor. A further product under the trade name of Nimco 2029, comprising a sulfurized wool grease containing about 8 percent of sulfur is available for use in imparting oxidation-inhibiting and anti-squawk properties to mineral oils. It was found, however, that the addition of necessary sulfur-containing anti-squawk and oxidation inhibitors produced a composition which would not pass the oven rubber seal test.

In order to demonstrate the present invention, a number of sample blends of mineral lubricating oils, described in Table II, with and without various combinations of the aforementioned additives and commercially available automatic transmission fluids, are presented in Table III. Blends number 1, 2, and 3 of Table III are mineral lubricating oils without additives. Blends 4, 5, and 6 are commercially available transmission fluids or so-called "factory-fill fluids." Blends 7 to 30 all contain various combinations of additives designed to impart thereto the desirable characteristics which must be present in an acceptable fluid. The blend numbers set forth in Table III will be utilized in subsequent tables to identify these compositions.

TABLE III

*Automatic transmission fluid compositions from commercially available additives*

| Blend No | Min. oil constituents, percent by weight | | | V. I. improver | Pour depressant | Detergent | Oxidation inhibitor |
|---|---|---|---|---|---|---|---|
| | 100 vis., neutral | 150 vis., bright | 70 vis., neutral | | | | |
| 1 | 100 | | | | | | |
| 2 | 58.0 | 42.0 | | | | | |
| 3 | 20.0 | 80.0 | | | | | |
| 4 | (1) | (1) | (1) | (1) | (1) | (1) | (1) |
| 5 | (2) | (2) | (2) | (2) | (2) | (2) | (2) |
| 6 | (3) | (3) | (3) | (3) | (3) | (3) | (3) |
| 7 | 98.25 | | | | | | 1.75 (D) |
| 8 | 89.9 | | | 6.5 | 1.0 | 2.6 (E) | |
| 9 [4] | 89.9 | | | 6.5 | 1.0 | 2.6 (F) | |
| 10 | | 21.0 | 69.0 | 6.0 | 1.0 | 3.0 (G) | |
| 11 | 99.0 | | | | | | |
| 12 | | 21.0 | 70.25 | 6.0 | 1.0 | 1.75 (I) | 1.0 (H) |
| 13 | | 20.0 | 70.5 | 6.0 | 1.0 | 3.0 (J) | 0.5 (K) |
| 14 | | 19.0 | 71.5 | 5.0 | 1.0 | 2.50 (J) | 1.0 (I) |
| 15 | 18.0 | 19.0 | 54.0 | 5.0 | 1.0 | 2.0 (J) | 1.0 (L) |
| 16 | 87.75 | | | 6.5 | 1.0 | 3.0 (J) | 1.75 (J) |
| 17 | 17.9 | 19.0 | 53.6 | 5.0 | 1.0 | 1.0 (L) | 2.0 (J) |
| 18 | 17.9 | 19.0 | 53.6 | 5.0 | 1.0 | 3.0 (L) | 0.5 (K) |
| 19 | 88.9 | | | 6.5 | 1.0 | 2.6 (F) | 0.5 (K) |
| 20 | | 21.0 | 69.0 | 6.0 | 1.0 | 1.5 (E) | 1.0 (D) |
| 21 | 88.9 | | | 6.5 | 1.0 | 2.6 (E) | 0.25 (M) |
| 22 | | 20.0 | 66.0 | 6.0 | 1.0 | 4.5 (E) | 1.0 (I) |
| 23 | | 21.0 | 67.5 | 6.0 | 1.0 | 1.5 (E) | 2.5 (D) |
| 24 | 87.5 | 1.0 | | 6.5 | 1.0 | 3.0 (G) | 3.0 (N) |
| 25 | 88.5 | | | 6.5 | 1.0 | 3.0 (G) | 1.0 (D) |
| 26 | 88.5 | | | 6.5 | 1.0 | 3.0 (G) | 1.0 (H) |
| 27 | | 20.0 | 71.75 | 6.5 | 1.0 | 3.0 (G) | 1.0 (I) |
| 28 | | 13.0 | 68.0 | 5.0 | 1.0 | 3.0 (G) | 0.25 (M) |
| 29 [5] | | 6.5 | 34.0 | 5.5 | 5.0 | 4.0 (G) | 4.5 (N) |
| 30 | 82.5 | 4.5 | | 2.75 | 2.5 | 2.0 (G) | 2.25 (N) |
| 31 | | 13.0 | 68.0 | 3.0 | 1.5 | 4.0 (G) | 4.5 (N), 0.001 (P) |
| | | | | 5.5 | 5.0 | 4.0 (G) | 4.5 (N), 0.001 (P) |

[1] ATF composition "A".
[2] ATF composition "B".
[3] ATF composition "C".
[4] Heat stabilized.
[5] Diluted with 50% of reference oil LL-137.

Arbitrary letter designations have been given to identify the various additives used in the formulations of Table III. The viscosity index improver used in the blends is Acryloid 710 and the pour depressant is Santopour B. Blend 30 contains Santopour B concentrate. The miscibility, toxicity, flash point, fire point, odor, and viscosity stability requirements for an acceptable automatic transmission fluid are all met by those blends which contain a viscosity index improver and a pour depressant. However, experiments have indicated that the oven rubber seal test was the most exacting and that, although blends passed the A. S. T. M. rust test and the CRC-L-4 oxidation test, they had an adverse effect on rubber seals and gaskets, which are a necessary part of an automatic transmission. Actual 10,000 mile road tests of the otherwise acceptable ATF compositions A, B, and C gave no indication of cracking or hardening of rubber seals, but when these fluids were submitted to the oven rubber seal test, they did not come up to the standards set.

As a consequence, the oven rubber seal test, though severe, was set up as a criterion or preliminary screening test for the evaluation of the blends shown in Table III. Table IV, following, is a compilation of the physical characteristics, oven rubber seal test and A. S. T. M. rust test results, as determined according to the accepted procedure, for the blends of Table III.

seal. The hardness of the seal is determined before and after the test with a Durometer.

The results in Table IV show that the mineral lubricating oils selected do not pass the oven rubber seal test. The commercial ATF compositions A, B, and C likewise did not pass the test, although these compositions show no deterioration of rubber seals and gaskets during actual road testing in automatic transmissions. Blends 7-9, 11, and 12 containing either the detergents E, F, or I, or the oxidation inhibitors D and H alone show cracking or toughening of the rubber seals and consequently do not come up to the standard of the test. The blends 13-30, representing various combinations of detergents with oxidation inhibitors, as shown in Table III, disclose that the anti-oxidant detergent G in combination with any one of the inhibitors is the optimum combination for meeting the oven rubber seal tests (blends

TABLE IV

*Physical characteristics, oven rubber seal test, and A. S. T. M. rust test evaluation of automatic transmission fluid blends*

| Blend No. | Physical characteristics ||| Oven rubber seal test ratings ||||| A. S. T. M. rust test ||
|---|---|---|---|---|---|---|---|---|---|---|
| | Vis./100° | Vis./210° | V. I. | Durometer || Description of seal after test | Rating of seal | Appearance of oil | 1 | 2 |
| | | | | Before | After | | | | | |
| 1 | 102.2 | 39.7 | 101 | 75 | 85 | Slight splitting | Poor | Clear | | |
| 2 | 317 | 55.2 | 108 | 75 | 85 | Toughened | Fair | do | | |
| 3 | 114 | 41.1 | 118 | 75 | 85 | do | do | do | | |
| 4 | | | | 75 | 80 | No cracks | Good | do | | |
| 5 | | | | 75 | 78 | Edge split | Fair | do | | |
| 6 | | | | 75 | 78 | do | do | Slight brown ppt | Pass | Pass. |
| 7 | 104.3 | 40.1 | 113 | 75 | 83 | Slight cracking | Poor | Clear | do | Do. |
| 8 | 190.2 | 53.1 | 153 | 75 | 85 | Cracks | do | do | do | Do. |
| 9 | 185.7 | 52.9 | 154 | 75 | 83 | Slight toughening | Fair to good | do | do | Do. |
| 10 | | 56.3 | 151 | 75 | 79 | Like new | Good | Tarry deposits | do | Do. |
| 11 | 106.4 | 40.7 | 118 | 75 | 83 | Slight cracking | Poor | Clear | | |
| 12 | | | | 75 | 93 | Cracks | do | do | | |
| 13 | 192.9 | 54.2 | 155 | 75 | 83 | Tough | Good | do | | |
| 14 | 191.2 | 54.1 | 158 | 75 | 85 | Cracks | Poor | do | Pass | Do. |
| 15 | 203.8 | 55.4 | 154 | 75 | 90 | do | do | do | | |
| 16 | 203.8 | 55.8 | 155 | 75 | 85 | do | do | do | Fail | Do. |
| 17 | 187.5 | 53.8 | 155 | 75 | 86 | do | do | Sediment | Pass | Do. |
| 18 | 186.6 | 53.7 | 155 | 75 | 83 | Tough | Fair | | do | Fail. |
| 19 | | | | | | | | Clear | do | Pass. |
| 20 | | 55.9 | 151 | 75 | 80 | Edge split | Poor | Separation | | |
| 21 | | | | 75 | 80 | Edge cracks | do | Clear | | |
| 22 | | | | 75 | 80 | No cracks | Good | do | | |
| 23 | | | | 75 | 83 | Cracks | Fair | do | | |
| 24 | 201 | 54.1 | 151 | 75 | 79 | Like new | Good | do | | |
| 25 | | | | 75 | 80 | do | do | do | | |
| 26 | | | | 75 | 80 | do | do | do | | |
| 27 | | | | 75 | 80 | No cracks | do | do | Pass | Do. |
| 28 | 204 | 55.2 | 153 | 75 | 80 | Like new | do | do | do | Do. |
| 29 | | | | | | | | | do | Do. |
| 30 | 198 | 51 | 140 | 75 | 80 | Like new | Good | Clear | | |

Referring to Table IV, it is to be understood that, although particular blends do not meet the viscosity index requirement of 135-150, except the commercially available automatic transmission compositions A, B, and C and the mineral oils without additives, blends 1, 2, and 3, which are shown for comparison purposes, the proper adjustment of the amount of viscosity index improver could bring these blends up to standard. Also A. S. T. M. rust evaluations are not shown for some blends for the obvious reasons that they did not attain a satisfactory oven rubber seal test rating. However, on certain of the blends, both oven rubber seal test evaluations and A. S. T. M. rust evaluations are shown to indicate the criticality of the former.

The oven rubber seal test is conducted by filling a one-pint glass top Mason jar half full with the blend. A 1½ inch section of a rubber seal from a transmission is immersed in the blend and the jar is sealed and placed in an oven maintained at 300° F. for 125 to 150 hours. The section of the seal is removed and pressed to a mandrel of the same radius as the entire seal (5 inches in diameter). Observations are made to detect any cracking and changes in the appearance of the seal from a new 24-28). Of the various oxidation inhibitors known to impart oxidation stability to lubricating oils for use in internal combustion engines which were tested, the additive designated by the letter G (blend 10) alone passes the oven rubber seal test and the A. S. T. M. rust test but does not give entirely satisfactory CRC-L-4 ratings, and the pour point of this blend is only minus 30° F. Likewise, blend 24, although passing the oven rubber seal test, does not come up to the minus 35° F. pour point. The pour point of blend 24 is only minus 15° F. This defect can be overcome by proper adjustment of the ratio of the amounts of pour depressant and oxidation inhibitors, as will be explained. Blends 25 to 30 inclusive show that the combination of antioxidant inhibitor G and either of the oxidation inhibitors D, H, J, M, or N is the optimum for meeting the critical oven rubber seal test. Anti-oxidant inhibitor G is the proprietary product manufactured under the trade name of Enjay CPS-61, as has been described.

From the results of these experiments, wherein various known oxidation inhibitors commonly used in lubricating oils were evaluated for use in automatic transmission fluids, it is seen that, generally, such oxidation inhibitors do not have the property of inhibiting the deterioration of rubber seals, gaskets, and like component parts used in automatic transmission mechanisms. This is true with the exception of anti-oxidant inhibitor G, which has been found to not only have the property of protecting the component rubber parts of automatic transmission mechanisms, but also has been found to have the property of overcoming any deleterious effect which may be present in other known anti-oxidant addends normally used in lubricating oils. One embodiment of this inveniton comprises, therefore, the discovery of a new property of compounds of the general type of anti-oxidant inhibitor G when used in this new environment, that of an automatic transmission fluid.

Experiments have indicated that an additive having sulfur which is active or free below 350° F. as indicated by the copper strip test is not suitable for carrying a mineral oil through the oven rubber seal test. A comparison of blends 8 and 9, the former containing a sulfurized detergent in which active sulfur is present and the latter containing the same sulfurized detergent (in equal amount) in which there is no sulfur which is free or active below 350° F., shows the necessity for the absence of active sulfur in the detergent. Detergents or other additives used in the compositions must, therefore, be free from active sulfur. Prolonged heating of the sulfurized additive after the completion of the sulfurization reaction, as for example heat stabilization at temperatures of about 375° to 400° F. until good copper strip corrosion results are obtained, is essential for these sulfur-containing detergents.

Heat stabilization as practiced herein is applicable to compounds containing sulfur wherein the sulfur is associated in the molecule with carbon and hydrogen as in thio compounds (C—S—C) and not present as the thiophosphate, sulfonyl, sulfinyl, or mercapto linkages. For example, compounds like zinc hexyl dithiophosphate cannot be made to pass the oven rubber seal test by heat stabilization. Non-sulfur amines or hydroxy-containing type of additives have also proven to be satisfactory for use with metal salts of alkyl phenyl sulfides for purposes of attaining a blend which passes the Oven Rubber Seal test.

Referring again to Table IV, it is seen that the mineral oils selected cannot be blended to meet both 135–150 minimum viscosity index and 54–56 viscosity/210° F. requirements, as set up by the manufacturers of automatic transmissions. The presence of detergents and anti-oxidants in the blends does not effect the attainment of the physical requirements. In some instances, it was noted that the addition of a sufficient quantity of combination viscosity index improver and pour depressant caused an increase in the pour point of the blend, or so-called pour reversion. The use of a viscosity index improver having little or no pour depressant qualities overcomes this difficulty. The use of the combination of a 70 vis neutral and 150 high viscosity index bright stock as the lubricating oil base has the advantage of requiring lesser amounts of viscosity index improver to meet the specified 150 minimum viscosity index.

A Chevrolet L-4 varnish test summary is given in Table V, following, for several of the blends so far evaluated.

TABLE V

(CRC–L–4) Chevrolet L-4 evaluation

| Blend No. | Piston | Screen | Varnish | Sludge | Total | Bearing loss, (grams) | Oil consumption, qts. 1 hour | Neut. No. | Percent naph. insol. | Percent benzol insol. | Insol. resins | Percent increase in viscosity at 100° F. |
|---|---|---|---|---|---|---|---|---|---|---|---|---|
| 10 | 9 | 8 | 48 | 39 | 87 | 0.030 | 0.047 | 0.5 | 0.87 | 0.80 | 0.07 | 25.2 |
| 13 | 7 | 9 | 42 | 44 | 80 | .1214 | .056 | ¹0.45 | 0.39 | 0.30 | 0.09 | 13.4 |
| 20 | 8 | 8 | 47 | 39 | 86 | 0.066 | 0.028 | 0.39 | 0.77 | 0.73 | 0.04 | 28.9 |
| 22 | 7 | 9 | 46 | 40 | 86 | 0.752 | 0.041 | 0.50 | 0.94 | 0.92 | 0.02 | 23.8 |
| 24 | 9 | 8 | 49 | 38 | 87 | 0.083 | 0.0625 | 2.4 | 1.03 | 0.46 | 0.57 | 16.9 |
| 28 | 9+ | 9 | 49 | 40 | 89 | 0.13 | 0.09 | 0.67 | 1.06 | 0.93 | 0.13 | 30.0 |
| 29 | 8 | 9 | 48 | 41 | 89 | 0.057 | 0.035 | 0.62 | 1.03 | 0.84 | 0.19 | 35.0 |

¹ 0.06 new.

This test, referred to as the CRC-L-4 oxidation and varnish test as designated by the Coordinating Research Council, has as its minimum requirements an 85–90 total varnish and sludge rating, 0.30 gram maximum bearing loss and a 9 piston rating. The CRC-L-4 test is one of the requirements of the passenger car ATF acceptance tests as shown in Table I.

The fuel used in the tests of Table V was below the standards required in 2–104B fuel specifications. Therefore, the 9+ piston rating for blend 28 is considered exceptional. The reference oil LL-137 is below accepted 2–104B standards as related to its Chevrolet L-4 merit rating. Therefore, the 8 piston rating for blend 29, which is blend 28 diluted with 50.0 percent of reference oil LL-137, is considered satisfactory. The purpose of running this test with a diluted sample is to determine the safety factor present in the undiluted composition. This safety factor comes into play when, in an emergency, an acceptable fluid is not available for bringing the level of a transmission up to normal and an oil must be used which is not formulated for use as an automatic transmission fluid.

The determination of durability and viscosity stability part of the requirements of the Passenger Car ATF Acceptance Tests, comprises actual testing of the fluid in a transmission unit coupled to a conventional internal combustion engine. The fluid under test is maintained at about 275° F. and through external controls the transmission is caused to operate continuously through a number of shifting cycles, each spaced from the other by a 15-second idling period during which time the engine maintains a constant speed of 400 R. P. M. Thereafter, the engine is operated continuously through a number of shifting cycles under wide-open throttle for 45-second intervals during which time the transmission unit shifts through all torque ratios. A constant load of 170 pound-feet is maintained on the output shaft of the transmission. The transmission will have passed through 6000 cycles at the end of 1000 hours, the duration of the test. An acceptable fluid must successfully pass this test without adverse effect on the transmission and without any drastic change in the viscosity characteristics of the test oil. An oil such as blend 28 will pass this test readily.

The determination of anti-squawk or anti-chatter properties, a phenomenon related to the frictional qualities of the automatic transmission fluid, comprises actual testing of the fluid in the power transfer unit of an Oldsmobile test car. Prior to testing, new clutch facings and new bands are installed. Any part of the transmission which could absorb or be impregnated with an oiliness additive was replaced.

After the test blend is poured into the transmission, the test car is run for at least ten miles at moderate speeds. The actual "squawk" test is then conducted on a level dry stretch of road to eliminate tire slippage.

From a dead stop the car is accelerated through all gears at full throttle and then "braked down" slowly to a dead stop before the next cycle is resumed.

Oils with poor anti-squawk properties can be identified within two or three cycles. Moderately good oils require as many as ten cycles to produce a trace of squawk, and oils which passed were cycled as many as twenty times without a trace or squawk or chatter.

Whenever it is noted, the squawking or chattering occurs when the automatic transmission is shifting from second to third gear. A definite lurching of the car accompanies the transmission chatter. Sufficient anti-squawk agent not only eliminates the chatter but smoothes out the shifting cycle of the automatic transmission.

Blends 28 and 30 were evaluated in the above manner for squawk and chatter and found to be acceptable. Since sulfur-containing anti-squawk compounds were used during this evaluation and previous experience with the rubber seal test had indicated that the presence of sulfur, which is free or active at 350° F., as determined by the copper strip corrosion test, is detrimental, the effect of processing time or viscosity of the anti-squawk agents upon the pour point, Oven Rubber Seal test, and viscosity index of the preferred formulation (blend 28) was observed.

The anti-squawk additive was prepared by charging 90 parts of 45° winter sperm oil into an open kettle. The sperm oil had an API gravity of 28.80, iodine number 83.8, and saponification number of 136. Heat was applied to bring the sperm oil to a temperature of about 270° to 290° F. while the oil was being agitated. Ten parts of powdered sulfur were slowly added and the temperature was raised to 350° F. for about one hour during which time a slight exothermic reaction occurs, carrying the temperature to about 360° F. momentarily. The reaction was then completed by maintaining the kettle contents at a temperature of about 350° F., using various lengths of time to obtain anti-squawk and oiliness bases of various viscosities.

The effect of using 4.5 percent by weight of sulfurized sperm oil, having four different viscosities because of variations in reaction conditions, as part of the blend 28, upon the viscosity index and pour point is shown in the following Table VI. Although winter grade sperm oil having particular physical properties was used in these experiments, the invention is not to be limited thereby and may be applied to any grade of sperm oil or compound containing a substantial quantity of mono esters of wax acids as are present in sperm oil. Examples of such compounds are wax esters and unsaturated mono esters of monhydric alcohols which have been surfurized in accordance with the present invention to form anti-oxidant or anti-squawk addends.

From Table VI, it can be seen that an increase in the viscosity of the sulfurized sperm oil anti-squawk base from 141.9 SUS at 210° F. to 211.2 had little or no effect upon the viscosity index of the finished blend, but did vastly effect the pour point of the blend. The viscosity of the anti-squawk agent is a function of the reaction or processing time and must not exceed about 190 SUS at 210° F. if the blend is to meet the below minus 35° F. pour point. Six and one-half to eight hours appears to be sufficient processing time to yield an anti-squawk agent of the desired viscosity and sulfur activity to meet both the pour point requirement and the rubber seal test. The sulfur activity, as indicated by the one minute copper strip test at 350° F. changes very little after six and one-half hours processing time.

The preferred blends 28 and 30 meet all of the physical, chemical, and mechanical requirements of an acceptable automatic transmission fluid and have the following compositions:

BLEND 28

| Constituent | Wt. percent |
| --- | --- |
| 150 vis. bright stock oil | 13.0 |
| 70 vis. neutral oil | 68.0 |
| Acryloid 710 (an acrylic acid polymer vis. at 210° F. 3,000–3,400 SUS) VI improver | 5.5 |
| Santopour B, low mol. wt. cond. product of chlorinated wax and a phenol, pour depressant | 5.0 |
| Enjay CPS-61 (Ba salt of hydroxy diisobutyl phenyl sulfide with calcium sulfonate) | 4.0 |
| Sulfurized sperm oil, heat stabilized to vis. not greater than 190 SUS at 210° F | 4.5 |

BLEND 30

| Constituent | Wt. percent |
| --- | --- |
| 100 vis. neutral oil | 82.5 |
| 150 vis. bright stock oil | 4.5 |
| Acryloid 710 (an acrylic acid polymer, vis. at 210° F. 3,000–3,400 SUS) VI improver | 3.0 |
| Santopour B, (low mol. wt. cond. prod. of chlorinated wax and a phenol) pour depressant | 1.5 |
| Enjay CPS-61 (Ba salt of hydroxy diisobutyl phenyl sulfide with calcium sulfonate) | 4.0 |
| Sulfurized sperm oil, heat stabilized to vis. not greater than 190 SUS at 210° F | 4.5 |
| DC-200 (a silicone polymer) | 0.001 |

The composition of these two blends, as shown above, is subject to some variation provided there is flexibility in the physical properties of the lubricating oil base or blends thereof. With a given substantially uniform lubricating oil base and a sufficient amount of viscosity index improver to meet the required viscosity index of 135–150, it was found that the quantities of pour depressant and anti-squawk agent needed fall within certain ranges. In addition, there is a relationship between the amounts of pour depressant and anti-squawk agent present in the blends. This is best shown by way of example by using particular amounts of lubricating oil and viscosity index

TABLE VI

*Effect of viscosity of sperm oil base on the pour point of automatic transmission fluid blend 28*

| | Characteristics of anti-squawk base | | | | | Characteristics of ATF blend containing base | | | |
| --- | --- | --- | --- | --- | --- | --- | --- | --- | --- |
| Base No. | Percent 45° winter sperm oil | Percent sulfur added | Percent sulfur by analysis | Processing at 350° F., hours | Base viscosity, SUS at 210° F. | Viscosity of blend, SUS | | | Actual pour point of blend, °F. |
| | | | | | | At 100° F. | At 210° F. | V.I. | |
| 28a | 90 | 10 | 9.48 | 6½ | 141.9 | 198.4 | 54.3 | 153 | B−50 |
| 28b | 90 | 10 | 9.47 | 6½ | 169.3 | 211.2 | 55.3 | 150+ | −45 |
| 28c | 90 | 10 | 9.38 | 8 | 188.3 | 208.4 | 54.7 | 150 | −40 |
| 28d | 90 | 10 | 9.11 | 12 | 211.2 | 207.0 | 55.3 | 152 | −25 | improver designed to yield a blend with the proper viscosity index and varying the amounts of pour depressant and anti-squawk agent. In Table VII, following, are shown seven different formulations of blend 28.

The sulfurized sperm oil used as an anti-squawk agent may vary in viscosity from 141 SUS at 210° F. to a maximum of about 185/190 SUS at 210° F. By using the maximum viscosity of the anti-squawk agent as a

TABLE VII

*Pour and viscosity values of blend 28 and variations*

| Blend | Formulation by weight | | | | | | Physical values | | | |
|---|---|---|---|---|---|---|---|---|---|---|
| | 70 vis. van | 150 br. st. | Acryloid 710 | Santopour B | Enjay CPS #61 | Sulfurized sperm | ASTM pour, °F. | Viscosity | | V.I. |
| | | | | | | | | 100° F. | 210° F. | |
| 28A | 68.5 | 12.5 | 5.5 | 5.0 | 4.0 | 4.5 | B−35 | 206.1 | 54.5 | 151 |
| B | 68.5 | 13.0 | 5.5 | 5.0 | 4.0 | 4.0 | B−35 | 204.2 | 54.6 | 151 |
| C | 68.5 | 13.5 | 5.5 | 5.0 | 4.0 | 3.5 | B−35 | 205.2 | 54.7 | 151 |
| D | 68.5 | 13.5 | 5.5 | 4.0 | 4.0 | 4.5 | −30 | 210.4 | 55.1 | 150+ |
| E | 68.5 | 14.0 | 5.5 | 4.0 | 4.0 | 4.0 | B−35 | 210.8 | 55.4 | 151 |
| F | 69.0 | 14.5 | 5.5 | 3.0 | 4.0 | 4.0 | −30 | 207.0 | 55.2 | 151 |
| G | 69.5 | 14.5 | 5.5 | 3.0 | 4.0 | 3.5 | B−35 | 207.1 | 55.1 | 151 |
| General Motors specifications (5-18-49) | | | | | | | [1]−35 | | 54/56 | [2] 150 |

[1] Maximum.  [2] Minimum.

From Table VII, it can be seen that lowering the relative proportion of anti-squawk agent to pour depressant had no effect on the pour point of the blend. However, a slight variation of the amount of pour depressant in relation to the anti-squawk agent caused a rise in the pour point above the acceptable minimum of below minus 35° F. (B−35). With about 3.5 weight percent of anti-squawk agent at least about 3.0 percent of pour depressant is necessary to meet the pour point requirement, and with 4.0 percent of anti-squawk agent about 4.0 percent of pour depressant is necessary. However, for amounts of anti-squawk agent above 4.0 percent, as much as 5.0 percent of pour depressant is necessary. The quantity of anti-squawk agent must be at least above about 3.0 percent since, with this amount, a trace of squawk was found during actual performance tests. When the amount of anti-squawk agent is raised to 4.5 percent, the squawk is completely eliminated.

The addition of an anti-squawk agent to the formulation has raised the amount of pour depressant required from 1.0 percent to about 5.0 percent as the amount necessary to insure a pour point of below minus 35° F.

control, the blending operation, to attain satisfactory anti-squawk performance, is simplified.

The General Motors Corporation specifications for an automatic transmission fluid, which has been used as an example of the typical requirements set forth by the manufacturers of automatic transmission units, was revised as of July 14, 1950. The required viscosity at 210° F. was reduced from 54–56 SUS to 49 SUS minimum. The 150 minimum viscosity index was eliminated and a new requirement of 7000 SUS maximum viscosity at 0° F. was substituted therefor. An additional viscosity stability requirement has been stipulated for the modified specifications wherein the drop in viscosity at 210° F. after performance tests is limited to 46.5 SUS minimum.

The following Table VIII illustrates that blends 28 and 30 have physical values meeting the original and modified General Motors specifications, respectively, and have physical and chemical characteristics meeting the recommended values which have been established by workers in this art.

TABLE VIII

*Physical values of blends 20 and 30 compared with original and modified General Motors requirements and with recommended inspection limits*

| Test | Actual values | | G. M. C., original | | G. M. C., modified | | Recommended | |
|---|---|---|---|---|---|---|---|---|
| | Blend 28 | Blend 30 | Min. | Max. | Min. | Max. | Min. | Max. |
| Gravity | 32.2 | 30.6 | | | | | 29.5 | 32.5 |
| Flash, °F | 370 | 415 | 365 | | 365 | | 365 | |
| Fire, °F | 415 | 450 | 395 | | 395 | | 395 | |
| Viscosity stability: | | | | | | | | |
| SUS/210° F | | | Pass | | 46.5 | | | |
| SUS/0° F | | | | | | 7,000 | | |
| Viscosity: | | | | | | | | |
| SUS/0° F | 4,000 | 5,800 | | | | 7,000 | | 7,000 |
| SUS/100° F | 204 | 198 | | | | | 180 | 205 |
| SUS/130° F | 107 | 112 | | | | | | |
| SUS/210° F | 55.2 | 51 | 54 | 56 | 49 | | 49 | |
| Viscosity index | 153 | 140 | 150 | | | | 135 | 155 |
| Pour point, °F | [1]−35 | [1]−35 | | −35 | | −35 | | [1]−35 |
| Con. carbon residue | 0.76 | 0.66 | | | | | 0.56 | 0.86 |
| Neut. No | 0.01 | 0.01 | | | | | | 0.10 |
| Saponification No | 6.00 | 7.8 | | | | | 4.5 | 9.0 |
| Percent sulfur | 0.72 | 0.67 | | | | | 0.50 | 0.85 |
| Percent phosphorus | Nil | Nil | | | | | | Trace |
| Percent chlorine | Nil | Nil | | | | | | |
| Sulphated residue, percent | 0.61 | 0.57 | | | | | Nil | Nil |
| Percent calcium | 0.02 | 0.19 | | | | | 0.53 | 0.65 |
| Percent barium | 0.32 | 0.30 | | | | | 0.015 | 0.024 |
| | | | | | | | 0.26 | 0.36 |

[1] Below.

Blend 30, having a lower concentration of pour depressant, permits greater flexibility needed to compensate for variations in viscosity of the other additives. This blend passes the oven rubber seal test and, in general, represents the preferred combination of ingredients forming an acceptable automatic transmission fluid in accordance with this invention.

These changes of the physical requirements of the General Motors Corporation allow more flexibility in the automatic transmission fluid formulations. Although the blends disclosed herein by way of illustration are subject to variation as to the amounts of ingredients therein and the formulations presented may be modified to meet general recommended specifications not as rigorous as those required by automatic transmission manufacturers, it is to be understood that the invention is not to be limited by any test procedure or method of evaluation. Any method for transmitting torque or power by means of hydrokinetic forces in a fluid-actuated mechanism or a composition therefor, wherein a fluid is used employing ingredients bearing the relationship to each other herein disclosed and claimed, comes within the scope of the invention.

The new Detroit Transmission Foam test can be met through the use of a small percent of a foam depressant. One such proprietary product under the trade name of DC-200 was found to be entirely satisfactory in eliminating foam. DC-200 is a silicone-containing material having a viscosity of 12,500 centistokes at 25° C. Only 0.001 percent of this material is necessary to reduce the foaming tendencies of the formulation below that of commercially available automatic transmission fluids.

In the blending of the automatic transmission fluid compositions of the present invention, the mineral oil portion is first charged to the blending kettle in the proportions by weight or volume indicated. Each of the additives is added to the mineral oil in succession—the viscosity index improver, the pour depressant, the oxidation and rust inhibitors, and then the anti-foam agent. The blending is facilitated by constant stirring. Since the physical and the mechanical performance of the finished blends is dependent upon a rather delicate balance of additives, extreme care should be exercised in obtaining in the blend the exact proportions specified for each ingredient.

Certain other aspects of the blending become important where particular additives are being used. For example, to insure adequate distribution of the foam depressant, it is added while the remainder of the blend is stirred and heated. This technique helps overcome the limited solubility of the foam depressant. The addition of heat also insures uniformity of the finished blend containing such a high percentage of additives. The best blending temperatures have been found to be between about 180° F. and 200° F. After the blending has been completed, the finished product may be packaged after it has been allowed to stand for about fifteen minutes.

What is claimed is:

1. An automatic transmission fluid composition characterized by its ability to pass the passenger car automatic transmission fluid acceptance tests, including the oven rubber seal test and the CRC-L-4 oxidation and varnish test comprising a major portion of a mineral lubricating oil having a viscosity of about 110 SUS at 100° F., a small amount of a viscosity index improver sufficient to yield a composition having a viscosity index of about 135 to 150, a small amount of a pour depressant sufficient to produce a composition having a pour point of about below −35° F., a sufficient amount of at least one sulfur-containing anti-squawk and oxidation-inhibiting agent of the group consisting of sulfurized wool grease containing about 4 wt. percent of sulfur, sulfurized wool grease containing about 8 wt. per cent of sulfur, sulfurized sperm oil and sulfurized terpenes to enable said composition to pass the CRC-L-4 oxidation and varnish test, said last mentioned agents being characterized by their reactivity to rubber seals and gaskets as evidenced by the Oven Rubber Seal Test, and about 3.0 to 4.0 wt. percent of a composition consisting of a mixture of an oil soluble polyvalent metal salt of alkylated hydroxy aryl sulfide and calcium sulfonate whereby the reactivity of said sulfur-containing agent to said rubber seals and gaskets is overcome.

2. A composition in accordance with claim 1 in which the sulfur-containing anti-squawk and oxidation-inhibiting agent is sulfurized sperm oil prepared by reacting about 90 parts of sperm oil with about 10 parts of sulfur at about 350° to 360° F., followed by heat stabilization at 375° to 400° F. until the product is non-corrosive to copper at about 350° F. and said product has a viscosity no greater than 190 SUS at 210° F. as a result of the heat stabilization.

3. A composition in accordance with claim 1 in which the oil soluble polyvalent metal salt of alkylated hydroxy aryl sulfide is the barium salt of hydroxyl diisobutyl phenyl sulfide.

4. A composition in accordance with claim 1 containing above about 3.0 wt. percent of sulfur-containing agent and about 3.0 wt. percent of said pour depressant in order to meet the acceptable minimum pour point of below −35° F.

5. A composition in accordance with claim 1 containing about 4.0 wt. percent of sulfur-containing agent and about 4.0 wt. percent of said pour depressant in order to meet the acceptable minimum pour point of below −35° F.

6. A composition in accordance with claim 1 containing about 4.5 wt. percent of sulfur-containing agent and about 5.0 wt. percent of said pour depressant in order to meet the acceptable minimum pour point of below −35° F.

7. An automatic transmission fluid composition characterized by its ability to pass the passenger car automatic transmission fluid acceptance tests comprising about 13 wt. percent of 150 viscosity bright stock oil, about 68 wt. percent of 70 viscosity neutral oil, about 5.5 wt. percent of an acrylic acid polymer V. I. improver, about 5 wt. percent of a pour point depressant comprising the condensation product of a chlorinated paraffin wax and phenol, about 4 wt. percent of a composition consisting of a mixture of the barium salt of hydroxy diisobutyl phenyl sulfide and calcium sulfonate, and about 4.5 wt. percent of sulfurized sperm oil prepared by reacting about 90 parts of sperm oil with about 10 parts of sulfur at about 350° to 360° F., followed by heat stabilization at 375° to 400° F. until the product is non-corrosive to copper at about 350° F. and said product has a viscosity no greater than about 190 @ 210° F. as a result of said heat stabilization, and about 0.001 weight percent of a silicone-containing foam depressant.

8. An automatic transmission fluid characterized by its ability to pass the passenger car automatic transmission fluid acceptance tests comprising about 82.5 wt. percent 100 viscosity neutral oil, about 4.5 wt. percent 150 viscosity bright stock oil, about 3.0 wt. percent of a V. I. improver comprising an acrylic acid polymer having a viscosity of about 3000 to 3400 SUS at 210° F., about 1.5 wt. percent of a pour point depressant comprising a low molecular weight condensation product of a chlorinated paraffin wax and phenol, about 4.0 weight percent of a composition consisting of a mixture of barium salt of hydroxy diisobutyl phenyl sulfide and calcium sulfonate, about 4.5 wt. percent of sulfurized sperm oil prepared by reacting about 90 parts of sperm oil with about 10 parts of sulfur at about 350° to 360° F. followed by heat stabilization at 375° to 400° F. until the product is non-corrosive to copper at about 350° F. and said product has a viscosity no greater than about 190 SUS at 210° F.

as a result of said heat stabilization, and about 0.001 wt. percent of a silicone-containing foam depressant.

References Cited in the file of this patent

UNITED STATES PATENTS

| | | |
|---|---|---|
| 2,091,627 | Bruson | Aug. 31, 1937 |
| 2,179,066 | Smith | Nov. 7, 1939 |
| 2,379,241 | McNab et al. | June 26, 1945 |
| 2,504,552 | Lewis | Apr. 18, 1950 |
| 2,509,620 | Watson et al. | May 30, 1950 |
| 2,512,255 | Montgomery et al. | June 20, 1950 |
| 2,528,348 | Denison et al. | Oct. 31, 1950 |
| 2,550,760 | Bishop | May 1, 1951 |